United States Patent
McDowall et al.

(10) Patent No.: US 8,228,445 B2
(45) Date of Patent: *Jul. 24, 2012

(54) REAR PROJECTION IMAGING SYSTEM WITH IMAGE WARPING DISTORTION CORRECTION SYSTEM AND ASSOCIATED METHOD

(75) Inventors: Ian E. McDowall, Mountain View, CA (US); Mark T. Bolas, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/013,698

(22) Filed: Jan. 25, 2011

(65) Prior Publication Data

US 2011/0176070 A1  Jul. 21, 2011

Related U.S. Application Data

(63) Continuation of application No. 11/846,146, filed on Aug. 28, 2007, now Pat. No. 7,876,384, which is a continuation of application No. 11/256,242, filed on Oct. 20, 2005, now Pat. No. 7,262,816.

(60) Provisional application No. 60/621,268, filed on Oct. 22, 2004.

(51) Int. Cl.
*H04N 9/31* (2006.01)
*H04N 3/23* (2006.01)

(52) U.S. Cl. ........ 348/745; 348/744; 348/746; 348/756; 359/456; 353/69

(58) Field of Classification Search .................. 348/745, 348/746, 747, 744, 756, 806, 807; 359/456, 359/453, 447, 448; 353/69, 77, 78, 66, 70, 353/98; 345/647

See application file for complete search history.

(56) References Cited

U.S. PATENT DOCUMENTS

| | | | |
|---|---|---|---|
| 4,439,027 | A | 3/1984 | Shioda et al. |
| 5,200,815 | A | 4/1993 | Tsujihara et al. |
| 5,285,287 | A | 2/1994 | Shikama |
| 5,796,446 | A | 8/1998 | Marcellin-Dibon |
| 5,897,192 | A | 4/1999 | Seufert |
| 6,233,024 | B1 | 5/2001 | Hiller et al. |
| 6,367,933 | B1 | 4/2002 | Chen et al. |
| 6,392,821 | B1 | 5/2002 | Benner, Jr. |
| 6,520,646 | B2 | 2/2003 | Rodriguez et al. |
| 6,561,649 | B1 | 5/2003 | Burstyn |
| 6,618,076 | B1 | 9/2003 | Sukthankar et al. |
| 6,753,829 | B2 | 6/2004 | Ouchi |
| 6,836,298 | B2 | 12/2004 | Song et al. |
| 6,896,375 | B2 | 5/2005 | Peterson et al. |
| 7,055,958 | B2 | 6/2006 | Tajima |
| 7,055,960 | B2 | 6/2006 | Chang et al. |

(Continued)

*Primary Examiner* — Jefferey Harold
*Assistant Examiner* — Jean W Desir
(74) *Attorney, Agent, or Firm* — K. David Crockett, Esq.; Paul J. Backofen, Esq.; Crockett & Crockett, PC

(57) ABSTRACT

A rear projection imaging system with an image warping distortion correction system using a camera and processing unit to generate a warping map that corrects for image distortion. The warping map is generated in an iterative process by displaying a known pattern on a viewing screen and, through the use of a camera, having a microprocessor determine the location and shape of the pattern on the screen. The microprocessor then compares the displayed image to the original reference image, calculates the distortion effects present in the projection optics, and generates a warping map.

3 Claims, 5 Drawing Sheets

U.S. PATENT DOCUMENTS

| | | |
|---|---|---|
| 7,086,743 B2 | 8/2006 | Yamakawa |
| 7,131,732 B2 | 11/2006 | Inoue |
| 7,148,933 B2 | 12/2006 | Childers |
| 7,150,536 B2 | 12/2006 | Inoue |
| 7,187,343 B2 | 3/2007 | Pate |
| 7,196,741 B2 | 3/2007 | Hicks |
| 7,227,592 B2 | 6/2007 | Waters et al. |
| 7,262,816 B2 * | 8/2007 | McDowall et al. ............ 348/745 |
| 2003/0231261 A1 | 12/2003 | Bassi et al. |
| 2004/0140982 A1 | 7/2004 | Pate |
| 2004/0141157 A1 | 7/2004 | Ramachandran et al. |
| 2005/0094111 A1 | 5/2005 | May |
| 2005/0275811 A1 | 12/2005 | Peterson et al. |
| 2005/0276448 A1 | 12/2005 | Pryor |

* cited by examiner

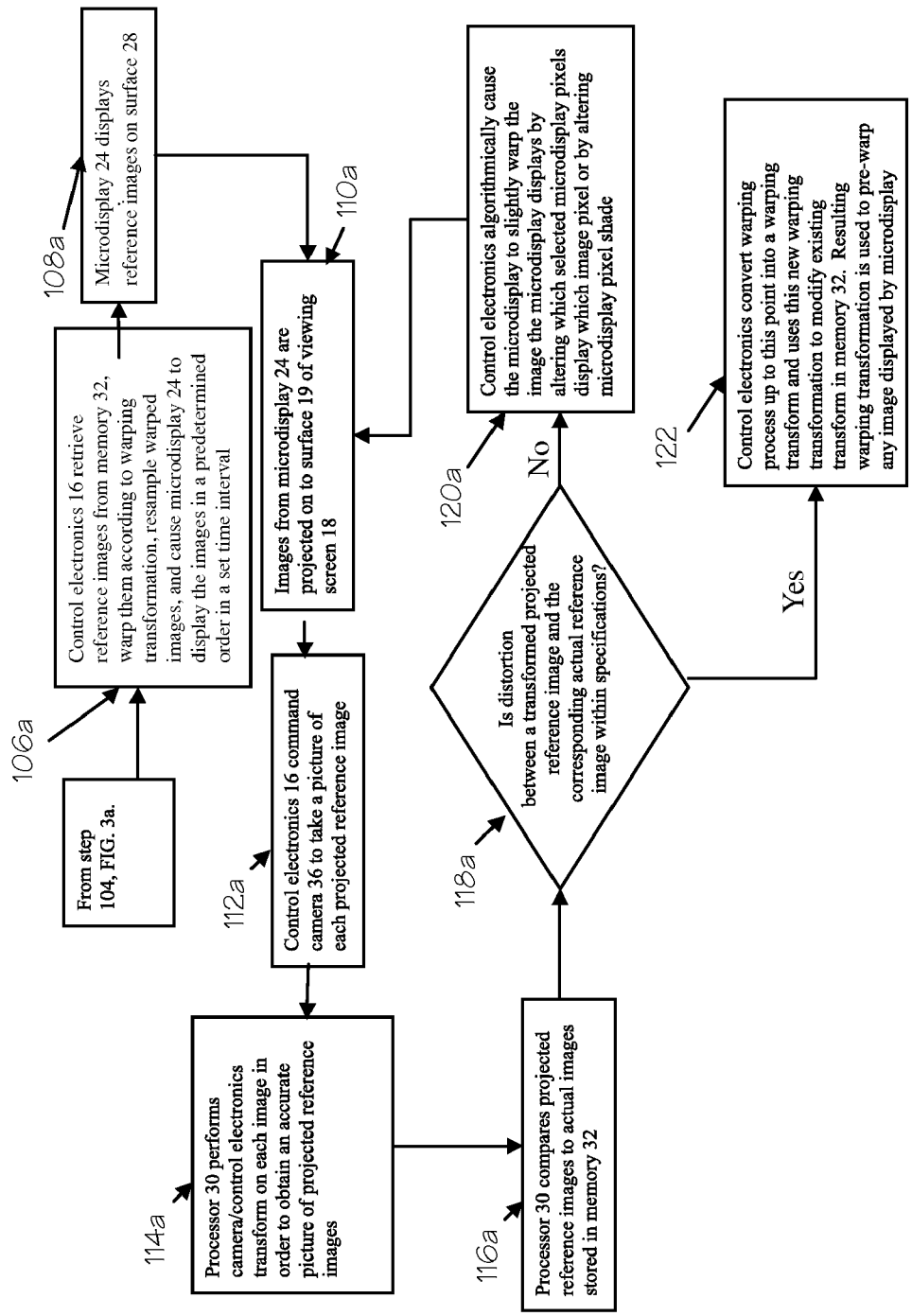

REAR PROJECTION IMAGING SYSTEM WITH IMAGE WARPING DISTORTION CORRECTION SYSTEM AND ASSOCIATED METHOD

This application is a continuation of U.S. application Ser. No. 11/846,146, filed Aug. 28, 2007, now U.S. Pat. No. 7,876,384, which is a continuation of U.S. application Ser. No. 11/256,242, filed Oct. 20, 2005, now U.S. Pat. No. 7,262,816, which claims priority to U.S. Provisional Application No. 60/621,268, filed Oct. 22, 2004.

FIELD OF THE INVENTIONS

The inventions described below relate the field of microdisplay-based rear projection imaging systems.

BACKGROUND OF THE INVENTIONS

Big screen microdisplay-based rear projection imaging systems, such as televisions and monitors, are becoming increasingly popular with consumers. This is due to their combination of lightweight, high picture quality, price, and reliability over comparable large display technologies such as cathode ray tube (CRT) based rear projection imaging systems, plasma displays, and direct view liquid crystal displays (LCD). Microdisplay based rear projection imaging systems work by shining a light on single or multiple microdisplays (also known as imagers or light-valves) where an image is displayed. Microdisplays create this image by electronically turning "on" or "off" specific pixels within an array of pixels on the microdisplay's display surface. The properties of the light that shines through or on the pixels is altered based on the "on" or "off" state of the pixel. Microdisplays are typically either transmissive, where light shines through the display, or reflective, where light is reflected off the microdisplay. High temperature polysilicon (HTPS) is commonly used in transmissive microdisplays, and the most common reflective microdisplays are digital micromirror devices (DMD) and liquid crystal on silicon (LCOS). The light that shines through or off the microdisplays is directed by projection optics on to the back surface of a transmissive display screen, consequently showing the image from the microdisplay. In the process the microdisplay image is magnified, usually around one hundred times (100×) for a fifty-inch (diagonally measured) screen. An audience watches the image on the front surface of the display screen.

One drawback of microdisplay based rear projection imaging systems, at least compared to plasma and direct view LCD imaging systems, is the depth of the cabinet or enclosure. Plasma and direct view LCD imaging systems can potentially provide an imaging system with a fifty inch or larger screen in an enclosure that is a mere five inches "thin", or deep. A microdisplay based rear projection imaging system with a comparable screen size is at least twice as deep. Cabinet depth is a very important consideration to consumers due to the large volumes of space big screen imaging systems consume.

Reducing the depth of a microdisplay based rear projection imaging system requires either the use of expensive, precision projection optics or the sacrifice of displayed picture quality. The use of precision optics lessens or negates the price advantage microdisplay based rear projection imaging systems have over plasma displays and LCD imaging systems. High precision optics are necessary in the thin rear projection imaging systems due to the close proximity of the projector to the viewing screen and the angle of the projector. The projection unit for a microdisplay imaging system usually sits below the horizontal centerline of the screen due to space concerns, with the projection unit projecting up on to the back surface of the screen. The thinner a microdisplay rear projection imaging system is, the more acute the angle is between light rays exiting the projection optics and the screen.

Complex optical distortions result due to this acute projection angle and the wide-angle, short focal length lenses and optics necessary to achieve high magnification in a very short distance. These spatial and lens requirements result in geometric distortions such as keystones, pincushion effects, and anamorphic effects. "Keystoning" is a term used to describe the way a square or rectangular image is warped into a trapezoidal shape, with parallel top and bottom sides but angled vertical sides, when an image is displayed from off-axis on to an angled surface. Anamorphic effects also result from off axis projection, and cause unequal magnification of above- and below-axis parts of the image. Pincushion effects result from the choice of projection optics. A "pincushion effect" warps an image so that the centers of parallel lines curve towards the center of the screen. All these effects, unless corrected for, combine together to result in a warped, distorted image on the display screen.

Correcting the image distortions associated with thin, microdisplay based rear projection imaging systems requires both high precision projection optics and precision manufacturing. The tight tolerances associated with the precision manufacturing requirements further increase manufacturing costs. In addition to the tight tolerances, every part of the projection system must be properly installed and aligned to very high tolerances and must remain in alignment for the lifetime of the imaging system to avoid image distortion.

Some of the cost of manufacturing thin, microdisplay based rear projection imaging systems can be mitigated by electronically pre-warping the image displayed by the microdisplay, and thus allowing the use of less expensive, lower precision optics. The microdisplay projects a pre-warped image through the projecting optics, and the projecting optics distort the image again, back to normal dimensions. The end result is a projected image that looks undistorted on the display screen. The electronics driving the microdisplay pre-warp an image by taking a signal from an input device (such as a television tuner) and applying a predetermined warp map to the image. The combination of this image signal and warp map transformation determines which pixels the microdisplay turns on and off. Computing the predetermined warp map is a complicated and involved process requiring computed three-dimensional ray traces.

Both the lens based solution and the pre-warping based solution to correcting geometric distortions on microdisplay rear projection imaging systems suffer potential problems once the imaging systems are manufactured. Both solutions require that the projection optics and microdisplays stay in very precise alignment with each other and the display screen. If a rear projection imaging system is dropped or jostled during shipping, or if mounting fixture material properties relax as the imaging system ages, the optics and microdisplays may come out of alignment and cause the aforementioned geometric distortions. Less severe alignment problems such as changes in humidity or barometric pressure can cause the enclosure cabinet or mounts to warp and cause the misalignment of the different units as well.

Chromatic aberrations, or shifts in the color of an image, can likewise result from both rough handling of the imaging system and environmental changes. As stresses on projection optics change due to mounting fixture warping, the physical shape of the lens may change, causing issues with color resolution. Stress birefringence resulting from mounting fixture warping impairs the way optics handle polarized light. This is a considerable problem with imagers that require the use of polarized light such as microdisplays like LCOS and HTPS. Chromatic shift problems may also occur over time as an illumination bulb ages.

Some of the post-manufacturing distortion problems can be corrected by service personnel who can re-align the optics, the microdisplay, or microdisplays within the imaging system. This re-alignment can only solve minor problems and must be performed by a trained technician. There is no easy way for a consumer to quickly calibrate or realign the projection optics in an imaging system. There is also no current method for correcting problems stemming from optics or projection systems that are manufactured slightly out of tolerance.

Accordingly, it is desirable to provide a rear projection imaging system with image warping distortion correction system and an associated method. The warping distortion correction system allows the distortion-free rear projection imaging system to be manufactured in a very thin enclosure without having to resort to expensive, precision made projection optics.

SUMMARY

A rear projection imaging system with image warping distortion correction system and associated method uses a camera and processing unit to generate a warping map that corrects for image distortion. The warping map is generated in an iterative process by having the processing unit command the microdisplay and projection optics to display known patterns on the viewing screen. The processing unit, through the camera, notes the location and shape of the pattern on the screen, and compares it to the original reference image, thereby calculating the distortion effects present in the projection optics. Eventually the processing unit evaluates how to pre-warp the image on the microdisplay in order to project an image that ends up distortion free. This warping map, or warping transformation, is stored in memory on the electronics that drive the microdisplay. The warping transformation is applied to input video signals to the imaging system, causing the microdisplay to display a warped image (as compared to the desired image, based on the video input signal) that is warped by the projection optics into a final, displayed, undistorted image. This distortion correction system minimizes the need for expensive high quality optics by correcting geometric distortions, both rectilinear and non-rectilinear, as well as chromatic distortions. It also allows a picture to be centered on the viewing screen and completely fill the screen. All of these distortion problems may result from manufacturing errors, misalignment over time, chromatic shifts in the lamp bulb, and the like.

BRIEF DESCRIPTION OF THE DRAWINGS

FIGS. 3A and 3B illustrate a process in accordance with the invention in a flow chart format.

DETAILED DESCRIPTION OF THE INVENTIONS

Figure 1:
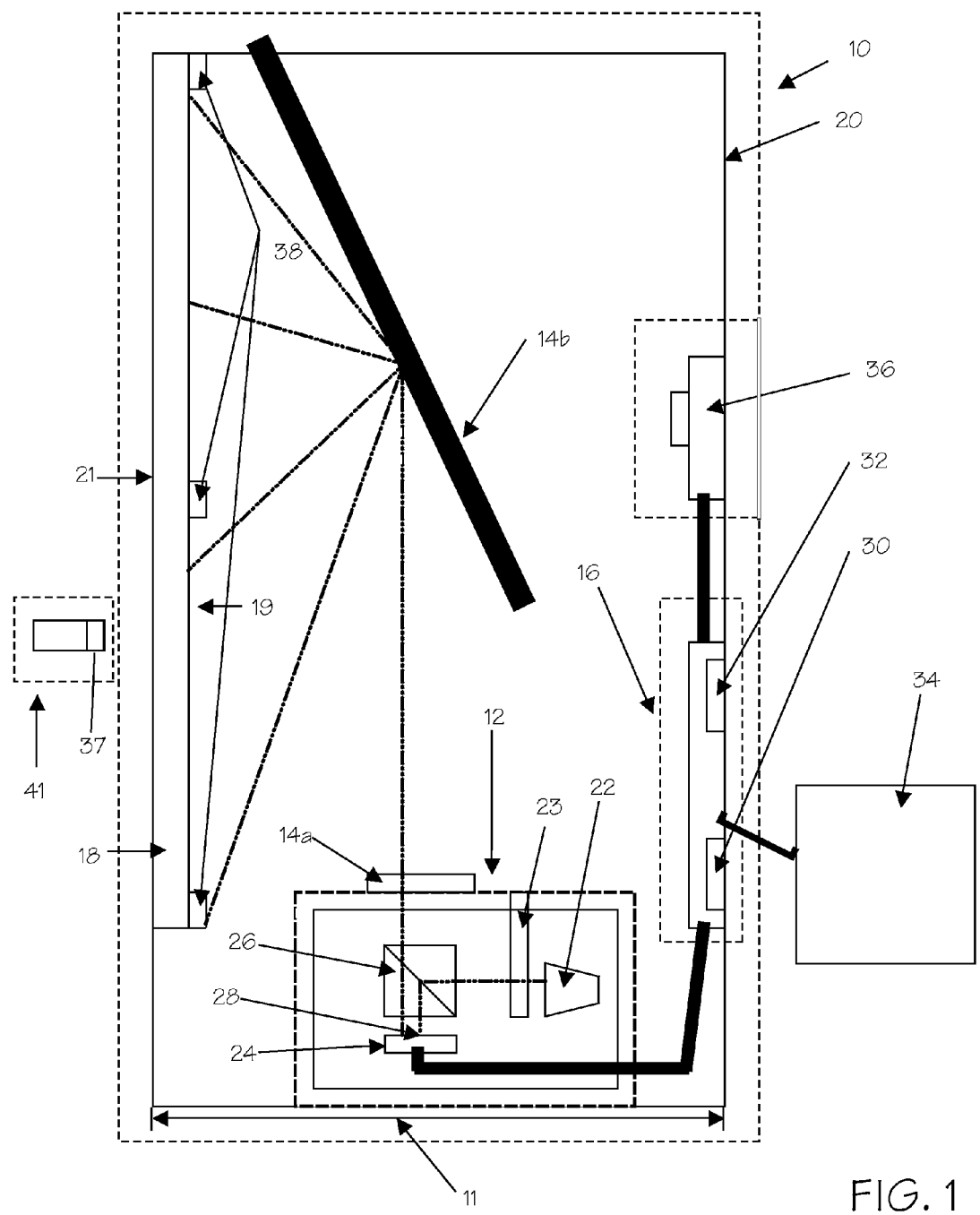
FIG. 1 shows a rear projection imaging system with an image warping distortion correction system.

FIG. 1 displays, in schematic form, a rear projection monitor 10. The rear projection monitor 10 comprises a projector 12, projection optics 14a and 14b, control electronics 16, a viewing screen 18, and a cabinet 20. Rear projection monitor 10 is of a thin type, meaning that the depth of cabinet 20, represented by distance 11 on FIG. 1, is less than seven inches. Rear projection monitor 10 may be used, for example, as a television, a home cinema, or the like. Projector 12 is mounted below the center horizontal axis of viewing screen 18 and projects upwards, off-axis. The illustrated projector is a single microdisplay projector for use in a rear projection imaging system and includes lamp 22, spinning color wheel 23, liquid crystal on silicon (LCOS) microdisplay 24, and polarizing beam splitter 26. A multiple microdisplay projector or a field sequential color microdisplay projector that may not require the use of a spinning color wheel, as well as projectors utilizing other microdisplay types such as transmissive liquid crystal displays (LCD) or digital micromirror devices (DMD) that may not require a polarizing beam splitter, or any other type of projector may be used in the system.

As is illustrated in FIG. 1, microdisplay 24 is a reflective type LCOS microdisplay. For the purposes of illustration microdisplay 24 is an XGA microdisplay, meaning that display surface 28 contains 786432 electronically controlled pixels arrayed in a grouping of 768 rows by 1024 columns. The operation of an LCOS projector is familiar to those skilled in the art. The pixels on display surface 28 of microdisplay 24 turn on and off based on the electrical signals received by the microdisplay. Light from lamp 22, which is filtered to display a certain color at an instant in time by spinning color wheel 23, is directed to display surface 28 by polarizing beam splitter 26. Light rays that reflect off pixels on display surface 28 take on the shade of the pixel based on the pixel's "on" or "off" state. Thus, the light rays reflecting off display surface 28, collectively, transmit a visual image displayed by the microdisplay.

The projected visual image radiates from projector 12 to projection optics. Projection optics includes wide angle, short focal length lens 14a and planar mirror 14b. Many other optical configurations may be used in the system. The projection optics project the image from projector 12 on to surface 19 (the back surface) of viewing screen 18. Viewing screen 18, for the purposes of illustration, is a fifty inch display screen (measured along the diagonal), although the system may be implemented with a larger or smaller screen. Viewing screen 18 is transmissive so that the image projected on to surface 19 (the back surface) can clearly be seen by viewers looking at front surface 21. Viewing screen 18 may be, for example, a Fresnel lens or some other diffusive material. Images projected on to the viewing screen are magnified by the projection optics approximately one hundred times (100×), from the approximately half-inch (measured diagonally) image on the microdisplay to the image displayed on the viewing screen.

Control electronics 16 are responsible for receiving input video signals from a video input device, calculating how to warp images based on the signals and a warping map, re-sampling the warped images to convert them to a pixel based images, and transmitting corresponding image generation commands to the microdisplay, for turning corresponding microdisplay pixels on and off in order to display a visual image. Control electronics 16 includes electronic processor 30 and memory 32. Processor 30 may include integrated circuits, a central processing unit (CPU), or the like. Memory 32 is non-corruptible rewriteable memory such as RAM, flash, or the like, and is used to store warping transformations and reference images. Warping transformations are coordinate based sets of electronic instructions that control how each portion of an input image is shifted and warped to an output image. Although in this explanation of an embodiment of the invention a warping transformation is executed prior to the image re-sampling process, a warping transformation may also be executed integrally with the re-sampling process. Also, the control electronics may implemented in several microprocessors, and various tasks may be accomplished in various portions of a control system comprising several microprocessors.

Control electronics 16 are configured to receive video signals from input source 34, such as a television tuner, digital versatile disk (DVD) player, or the like. The video signals correspond to desired display images. Processor 30 then calculates how to warp the images based on the warping transformation stored in memory 32. After calculating how to warp an image, processor 30 re-samples a warped image, generates image generation commands, and transmits those commands to cause specific pixels on display surface 28 to turn on or off, causing microdisplay 24 to display the pre-warped images that the processor just calculated. These images are then transmitted optically to projection optics 14, which warp the images as they are displayed on viewing screen 18. The combined result of the pre-warping done by the control electronics and the microdisplay and the counter warping from the projection optics is an undistorted picture displayed on viewing screen 18. Control electronics 16 are configured to also accept instructions or commands from outside electronics, such as a computational unit or the like (not illustrated).

While it is possible to pre-program the control electronics with a specific, known warping transformation, this is undesirable as it is easy to appreciate how even a little misalignment in some of the projection optics or a small manufacturing defect can result in a distorted image on viewing screen 18. Thus, the control electronics require a way to easily and efficiently calculate a warping transformation any time in the imaging systems lifetime. This is done using camera 36 which is configured to electronically share information with control electronics 16. Camera 36 is a digital camera with at least half the resolution of microdisplay 24. In this illustrative example microdisplay 24 is an XGA imager, and thus camera 36 is capable of taking pictures with 393216 pixels. Although camera 36 is located inside cabinet 20 in FIG. 1, and is turned to view surface 19 of viewing screen 18, it is also possible to locate the camera outside cabinet 20 and point it at surface 21 of viewing screen 18. Camera 36 may be attached to control electronics 16 only as part of a quality control step after manufacturing, delivery, or the like, or the camera may be permanently mounted inside or outside cabinet 20 and connected to electronics 16 to allow a customer to perform routine recalibration of the warping transformation. As illustrated, camera 36 is mounted in a calibrated location inside cabinet 20, pointing at surface 19 of viewing screen 18. In an additional embodiment of the invention, viewing screen 18 includes reference markers 38 for the purposes of aiding camera calibration with respect to viewing screen 18. Reference markers are located around the periphery of surface 19 of viewing screen 18. Although only three reference markers are illustrated in FIG. 1, it is possible to use more or less reference markers as necessary.

An alternative location for camera 36 is illustrated in FIG. 1 in accordance with an additional embodiment of the invention. In this embodiment of the invention camera 37 is located outside cabinet 20 and points at surface 21 of viewing screen 18. Camera 36 is part of remote control 41. Remote control 41 communicates in a known manner with rear projection monitor 10 through radio waves, infrared light beams, or the like. Remote control 41 may be, for example, configured to change television stations and/or video inputs on rear projection monitor 10 if the rear projection monitor is equipped with a television tuner. Camera 36 is configured to electronically communicate pictures to and receive commands from control electronics 16 using, for example, radio waves, infrared light beams, or the like.

Preferably, rear projection monitor 10 undergoes an extensive, computationally intensive image warping distortion correction at the time of manufacture, thereby generating a complete warping transformation, and retains the ability to perform minor, less intensive image warping distortion correction at any time by the user in order to update or 'touch-up' the original warping transformation. The original image warping distortion correction is done with outside electronics connected electronically to the rear projection monitor, and the electronics generate a warping transformation that is then stored in the rear projection monitor's on board memory or firmware. Any minor 'touch-up' image warping distortion correction performed later on in the rear projection monitor's lifetime begins by using the original warping transformation as a starting point.

In an alternative embodiment of the invention, the original warping transformation is generated entirely from system parameters such as lens focal lengths, distances between optics, and the like. The image warping distortion correction using the rear projection monitor's camera and control electronics is only performed by the rear projection monitor user in order to update the original warping transformation.

In a further embodiment of the invention, the original warping transformation generation and all further warping transformation modification is performed entirely by the electronics and camera in the rear projection monitor.

Figure 2:
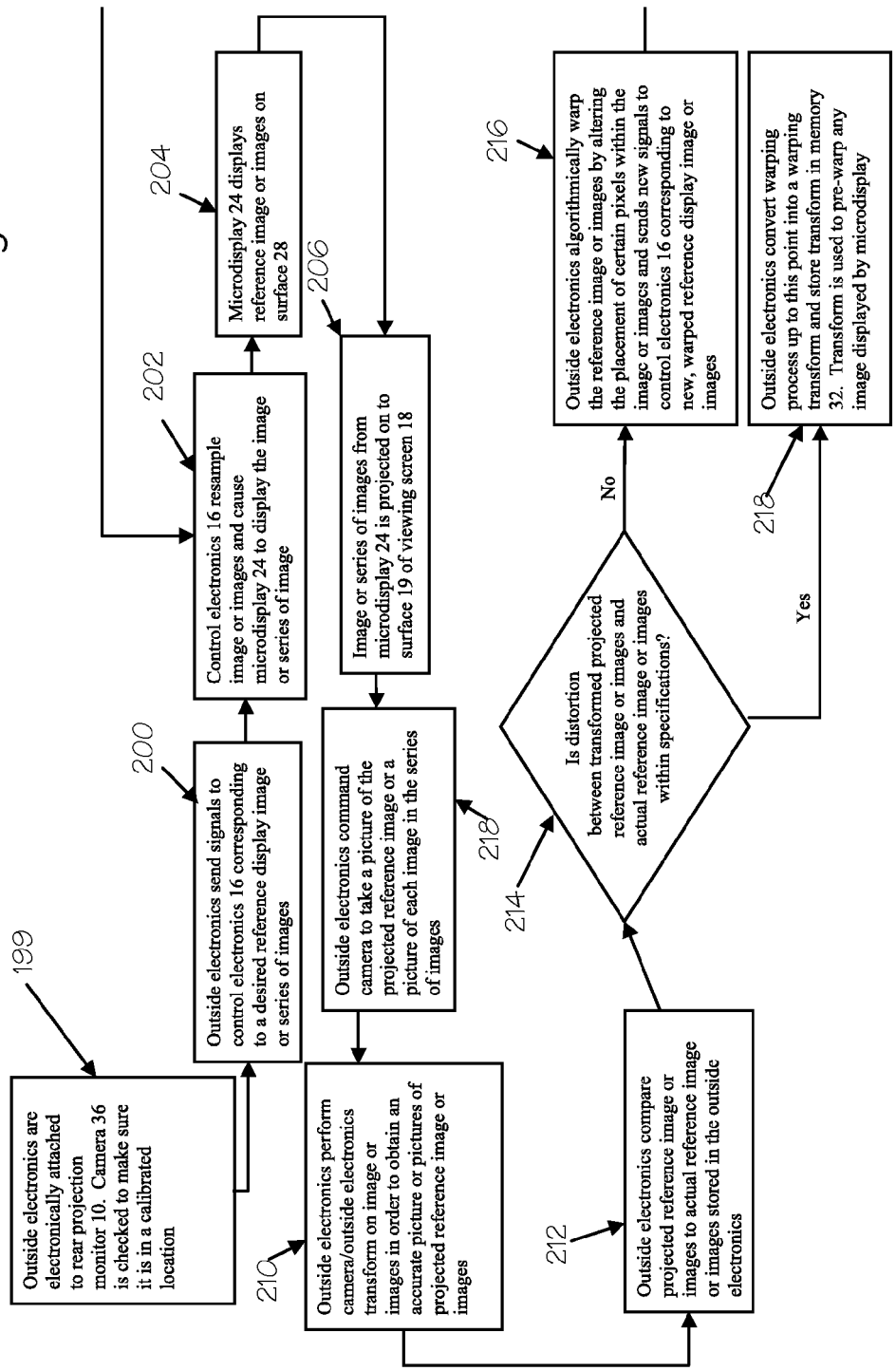
FIG. 2 illustrates a process in accordance with the invention in a flow chart format.

The method for factory-performed image warping distortion correction and obtaining the original warping transformation is illustrated in flow chart form in FIG. 2. With reference to FIG. 2 and continuing reference to FIG. 1, the method begins by electronically attaching outside electronics to rear projection monitor 10. The outside electronics may be, for example, a computer, a microprocessor with external memory, or the like. Camera 36 is checked to make sure it is in a calibrated location (step 199). In an additional embodiment of the invention, a separate camera that is in a calibrated position and is configured to electronically communicate with the outside electronics is utilized instead of camera 36. Next, outside electronics send signals to control electronics 16 corresponding to a desired reference display image or series of images that the outside electronics wish to have displayed on viewing screen 18 (step 200). Control electronics 16 then resample the image or series of images and cause pixels on microdisplay 24 to turn on and off in order to display this reference image or series of images (step 202). If memory 32 already contains a warping transformation, such as a pre-programmed warping transformation based on system parameters or the like, then the control electronics warp the reference image or images according to the warping transformation, resample them, and then cause microdisplay 24 to display the warped reference image or images. The reference image or images may be pictures of a grid, a rectangle, or any image that can easily show the effects of distortion. Microdisplay 24 displays the reference image or images on surface 28 (step 204). The image or series of images from microdisplay 24 is projected on to surface 19 of viewing screen 18 (step 206).

The outside electronics then command the camera to take a picture of the projected reference image or pictures of each image in the series of images (step 208). The outside electronics perform a known camera/outside electronics transform on the image from the camera in order to obtain an accurate picture of the projected reference image or images (step 210). The outside electronics compare the transformed projected reference image or images to each actual reference image or images stored in the outside electronics (step 212). For example, the outside electronics note the location and chromatic shade of certain pixels in the transformed projected reference image and compare these locations and shades to the relative locations and shades of the same pixels on the reference images stored in the outside electronics. These comparison pixels may be located anywhere on the images, though it is most beneficial to check areas like the corners, sides, and center of the image where distortion effects common to rear projection monitors are the largest. The outside electronics may even do a pixel-by-pixel comparison in order to obtain an accurate measure of the location and degree of distortion. The outside electronics may compare pixels from different areas on each of the images (if a series of reference images is utilized in the image warping distortion correction), for instance if problem areas for each image are known. The outside electronics may measure distortion individually for each color in a multi-color image or in an image that actually consists of multiple single-color images displayed very quickly in order to look like a specific color. The outside electronics then determine if the distortion between the projected reference image or images and the actual reference image or images is within predetermined specifications or reaches a minimum metric for the difference between the comparison pixels (step 214). Distortion is defined here and for the remainder of the description as the distance between pixels on the transformed projected reference image or images and the actual reference image or images or as the difference in chromatic shade between pixels in two comparison images; in other words, distortion is the mismatch between comparison pixels. A mismatch between comparison pixels on the two images (the transformed projected reference image and the actual reference image) indicates that the image projected on to the viewing screen is distorted. Thus, any image, reference or input, displayed on the viewing screen is not going to be an accurately reproduction of the desired image. If the distortion between the transformed projected reference image and the actual image is not within specifications, then the outside electronics algorithmically warp the reference image or images by altering the placement or shade of certain pixels within the image or images and sends new signals to control electronics 16 corresponding to new, warped display image or images (step 216). The warped image or images are then re-sampled by the control electronics, which causes the microdisplay to display the image or images, causing the image or images to be projected on to surface 19 of viewing screen 18. Therefore, steps 202 through steps 216 are repeated in an iterative manner until the distortion is within predetermined specifications. When this occurs, the outside electronics convert the warping process up to that point into a warping transformation and stores the warping transformation in memory 32 (step 218). The warping transform is then used to pre-warp any image displayed by microdisplay 24 in order to reproduce an accurate, undistorted image on viewing screen 18.

The factory set image warping distortion correction can thus be used to eliminate geometric or color distortions, allow the picture to be centered on the viewing screen, and stretch the displayed image so it fully fills the viewing screen.

Figure 3A:
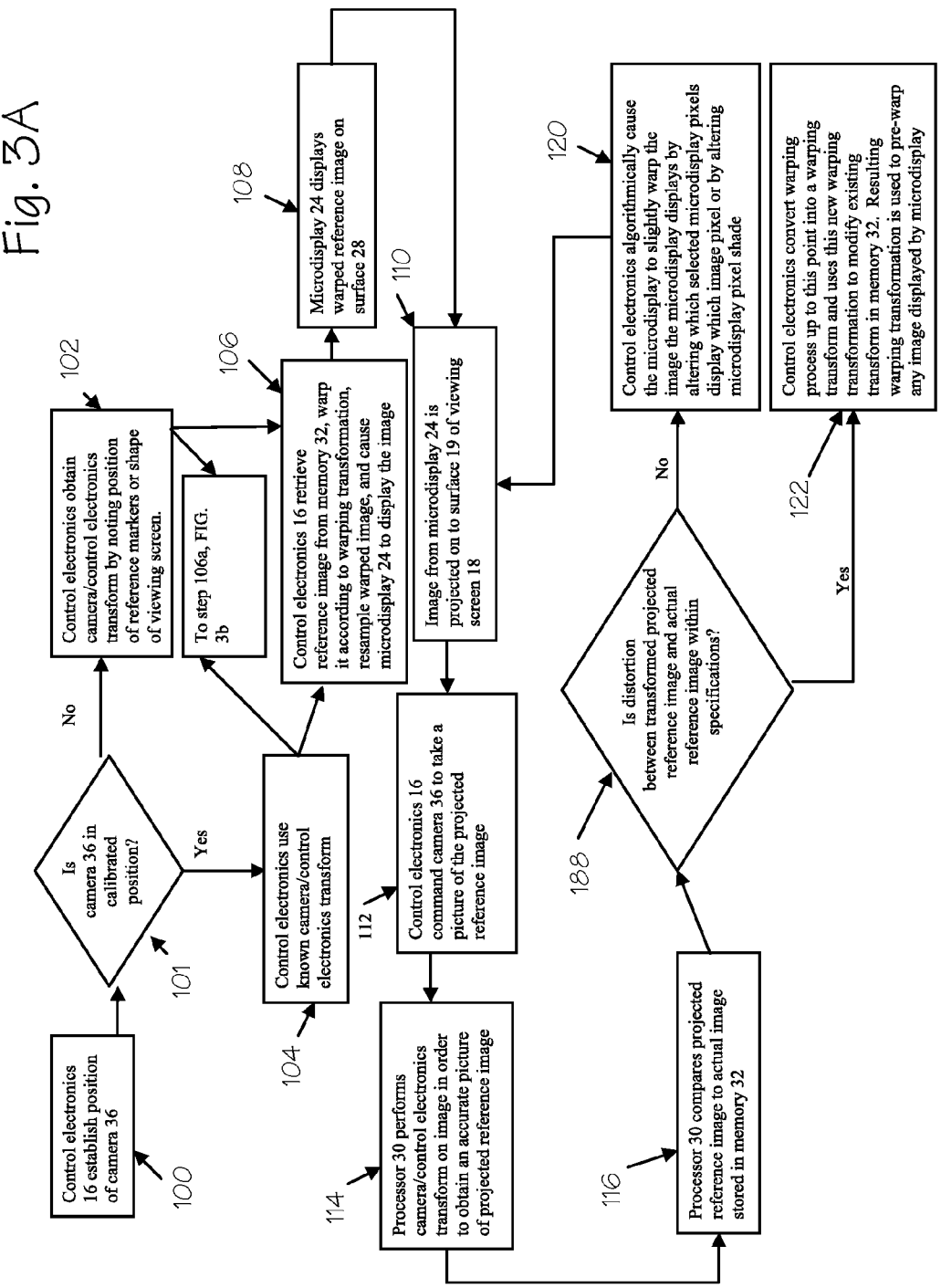

The method for touch-up image warping distortion correction and modifying the original, factory determined warping transformation is illustrated in flow chart form in FIGS. 3A and 3B. This method uses the existing, original factory determined warping transformation as a starting point. With reference to FIG. 3A and continuing reference to FIG. 1, control electronics 16 begin the process by establishing the position of camera 36 (step 100). Control electronics 16 ascertain if camera 36 is in its calibrated position (step 101). The control electronics do this by noting the positions of reference markers 38 in the pictures sent by camera 36 to control electronics 16, and comparing the locations of the reference markers in the pictures to the locations of the reference markers in pictures stored in memory 32. Alternatively, if viewing screen 18 does not include reference markers 38, then control electronics 16 can ascertain the position of camera 36 by noting the geometric shape of viewing screen 18 in pictures sent by the camera to the control electronics and again comparing it to reference shapes stored in memory 32. If the camera is not in its calibrated position, then the control electronics obtain a camera/control electronics transform by either noting the position of the reference markers in the pictures sent by the camera to the control electronics or by noting the geometric shape of the screen in these pictures (step 102). This camera/control electronics transform is necessary so that the control electronics can determine the location of a pixel on the actual viewing screen based on the location of a pixel in the picture captured by the camera. If the camera is in the calibrated position, then the control electronics use a known camera/control electronics transform stored in memory 32 (step 104). Next, control electronics 16 retrieve a reference image stored in memory 32, warp it according to the warping transformation also stored in memory 32, resample the warped reference image and then cause pixels on microdisplay 24 to turn on and off in order to display this reference image (step 106). The reference image may be a picture of a grid, a rectangle, or any image that can easily show the effects of distortion. The microdisplay displays the image on surface 28 (step 108), and the image from microdisplay 24 is projected on to surface 19 of viewing screen 18 (step 110).

The control electronics then command camera 36 to take a picture of the projected reference image (step 112). Processor 30 performs camera/control electronics transform on the image from camera 36 in order to obtain an accurate picture of the projected reference image (step 114), and processor 30 compares the transformed projected reference image to the actual reference image stored in memory 32 (step 116). For example, the processor will note the location and chromatic shade of certain pixels in the transformed projected reference image and compare these locations and shades to the relative locations and shades of the same pixels on the reference images stored in memory 32. These comparison pixels may be located anywhere on the images, though it is most beneficial to check areas like the corners, sides, and center of the image where distortion effects common to rear projection monitors are the largest. The processor then determines if the distortion, either geometric or color based, between the projected reference image and the actual reference image is within predetermined specifications (step 118). If the distortion between the transformed projected reference image and the actual image is not within specifications, then the control electronics algorithmically causes the microdisplay to slightly warp the image displayed by the microdisplay even more by altering which microdisplay pixels display which image pixel or by altering microdisplay pixel shade (step 120). This warped microdisplay image is then projected on to surface 19 of viewing screen 18, and steps 110 through steps 120 are repeated. Thus, the process is an iterative one until the distortion between the transformed projected reference image and the actual reference image falls within predetermined specifications. When this occurs, the control electronics convert the warping process up to that point into a warping transformation, modify the existing warping transformation with the newly calculated warping transformation, and store the resulting warping transformation in memory 32 (step 122). The warping transformation is then used to pre-warp any image displayed by microdisplay 24 in order to reproduce an accurate, undistorted image on viewing screen 18.

An additional embodiment of the distortion correction method is illustrated in FIGS. 3A and 3B using steps 106a, 108a, 110a, 112a, 114a, 116a, 118a, and 120a. In these steps, the control electronics use a variety of reference images to check and correct the distortion in the rear projection monitor.

With continuing reference to FIGS. 1 and 3A and reference to FIG. 3B, in this additional embodiment of the invention, after step 104 is completed, control electronics 16 retrieve reference images stored in memory 32, warp them according to the warping transformation also stored in memory 32, resample the warped reference images and then cause pixels on microdisplay 24 to turn on and off in order to display these reference images. The control electronics then cause pixels on microdisplay 24 to turn on and off in order to display these warped reference images in a predetermined order at some set time interval (step 106a). The reference images may be pictures of a grid, a rectangle, a chromatic scale, or any image that can easily show the effects of distortion. Each image may be, for example, tailored to specifically test for some distortion effect, such as keystoning, pin cushion, chromatic effects, or the like. The microdisplay displays the images on surface 28 (step 108a), and the images from microdisplay 24 are projected on to surface 19 of viewing screen 18 (step 110a).

The control electronics command camera 36 to take pictures of each projected reference image (step 112a). Processor 30 performs camera/control electronics transforms on the images from camera 36 in order to obtain an accurate picture of each projected reference image (step 114a), and processor 30 compares each transformed projected reference image to the actual reference image stored in memory 32 (step 116a). For example, the processor will note the location and chromatic shade of certain pixels in a transformed projected reference image and compare these locations and shades to the relative locations of the same pixels on each reference image stored in memory 32. These comparison pixels may be located anywhere on the images, though it is most beneficial to check areas like the corners, sides, and center of the image where distortion effects common to rear projection monitors are the largest. The processor may compare pixels from different areas on each of the images, for instance if problem areas for each image are known. Processor 30 may measure distortion individually for each color in a multi-color image or in an image that actually consists of multiple single-color images displayed very quickly in order to look like a specific color. The processor then determines if the distortion between a projected reference image and the corresponding actual reference image is within predetermined specifications (step 118a). If the distortion between a transformed projected reference image and the actual image is not within specifications, then the control electronics algorithmically cause the microdisplay to slightly warp each image displayed by the microdisplay by altering which microdisplay pixels display which image pixel or by altering the shade of certain microdisplay pixels (step 120a). Each warped microdisplay image is then projected on to surface 19 of viewing screen 18, and steps 110a through steps 120a are repeated. Thus, the process is an iterative one until the distortion between each transformed projected reference image and the actual reference image falls within predetermined specifications. Then, the control electronics convert the warping process up to that point into a warping transformation, modify the existing warping transformation with the newly calculated warping transformation, and store the resulting warping transformation in memory 32 (step 122). The warping transformation is then used to pre-warp any image displayed by microdisplay 24 in order to reproduce an accurate, undistorted image on viewing screen 18.

Each warping transformation described in the preceding methods may include multiple sets of instructions that warp an image displayed by microdisplay 24 differently in time; for example, the warping transformation may cause an image displayed by microdisplay 24 to warp slightly differently when color wheel 23 is filtering green light than when the color wheel is filtering blue light. Warping an image differently when different colored light is being filtered may, for example, be used to correct lateral color distortion without the use of expensive achromate lenses. Alternatively, if a projector utilizing multiple microdisplays, such as an LCOS projector using three microdisplays, one each to display red, green, and blue light, is used in rear projection monitor 10, then the warping transformation may contain different instructions for warping the picture on each microdisplay.

The foregoing touch-up methods can be performed easily at any time during the rear projection monitor's lifetime. The methods require a minimum of setup, and allow the picture quality to remain high despite misalignment, low-cost optics, manufacturing defects, and system component degradation with age.

If rear projection monitor 10 undergoes an extensive image warping distortion correction at the time of manufacture and stores the complex warping transformation in memory 32, then the manufacturer of the rear projection monitor may decide to limit the complexity of the self-diagnostic and self-correction touch-up system built into the rear projection monitor based on cost limitations and the recalibration necessary after the rear projection monitor ships. For example, a manufacturer may decide that certain distortion problems do not arise from the misalignment that occurs after shipping a rear projection monitor, and therefore it is only necessary to correct for this specific kind of distortion when a rear projection monitor is manufactured. Therefore, control electronics 16 may not be programmed to check for and correct this particular kind of distortion as part of a touch-up process because the warping transformation stored in memory 32 at the time of manufacture already solves the problem.

Note that these methods for correcting image distortion may decrease the number of microdisplay pixels actually being used to project the image. Depending on the warping transformation utilized in the final image warping distortion correction method, not all 786432 pixels of microdisplay 24 may be employed. The density of microdisplay pixels being used to project the picture may also vary from one area of the final, undistorted projected picture to another area. Both of these factors may lead to a slight decrease in picture quality as compared to a thin rear projection monitor that relies entirely on optical distortion correction. However, this image warping distortion correction system and method is more cost effective and far less susceptible to image distortion from out-of-tolerance alignments and components.

Distortions

Figure 4:
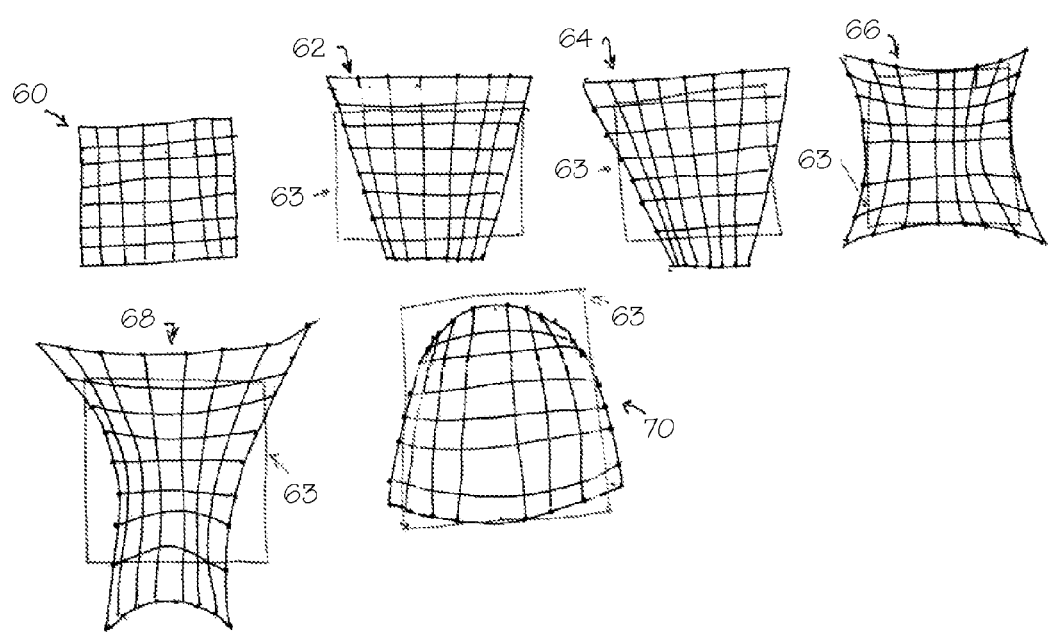
FIG. 4 shows distortion effects common to thin, rear projection monitors.

FIG. 4 illustrates geometric distortion effects common to thin, rear projection monitors utilizing off-axis projectors and low-cost optics. With reference to FIG. 4 and continuing reference to FIG. 1, image 60 represents an eight by eight grid image projected undistorted on to viewing screen 18. Image 62 represents the same image but projected on to the screen through optics that affect a trapezoidal geometric distortion known as a keystone. Note that in this illustrative example this distortion effect is projected in the absence of any other distortion effects. Keystone distortions are common when a projector projects an image off-axis, i.e., the image is projected upwards at an angle. The top edge of image 62 is longer than the bottom edge of image 62, and in the original undistorted image 60 both edges are the same length. Also, the sides are no longer parallel, as they should be. For reference purposes image 63, which represents the outline of undistorted image 60, is shown on top of image 62.

Image 64 represents the warping of image 60 by anamorphic distortions. Anamorphic distortions in this case also result from projecting images at an angle off-axis. The product of this distortion is different magnifications of portions of the image above and below the viewing screen's horizontal axis. The top and bottom edges are unequal lengths although they should be the same length. The sides are also no longer parallel. For reference purposes image 63 is shown on top of image 64.

Image 66 represents the warping of image 60 by pincushion distortions. Pincushion distortions are caused by using very wide-angle optics with short focal lengths. These optics are necessary in order to achieve the magnification necessary to project the image from microdisplay 24 on to viewing screen 18. Pincushion distortions cause the middles of parallel lines in the eight by eight grid pattern on image 66 to converge towards the center of image 66. For reference purposes image 63 is shown on top of image 66.

These individual distortion effects represented in images 62, 64, and 66 may combine together in an imaging system where all three distortions are present. Image 68 represents the warping of image 60 by a combination of keystone, anamorphic, and pincushion geometric distortions. Image 63 is again included on top of image 68 for reference purposes. This image is obviously very different from the original, undistorted image 60, and would require a great deal of optical correction to remove the effects of the three different geometric distortions.

Displaying an image that ends up looking like image 60 without optically correcting for keystone, anamorphic, and pincushion defects requires warping the desired image on the microdisplay display surface. The image is warped in such a way as to compensate for the optics distortion effects. Once a warping transformation is known, input images to control electronics 16 are warped in accordance with the warping transformation. Image 70 represents the warping of image 60 necessary to counter the other distortion effects. Image 63 is included on top of image 70 for reference purposes. Image 70 results from applying a warping transformation to image 60. When image 70 is projected on to viewing screen 18, the intended image 60 results due to the geometric distortions from the projection optics. By using warping transformations, rear projection monitor 10 is able to display distortion-free or nearly distortion-free pictures despite the presence of geometrically distorting optical effects.

Although the preceding examples all use classical geometric distortions to illustrate possible distortion problems solvable with the described system and method, it should be understood that the described system and method can be used to correct other geometric and color-based distortions as well. These other distortions include, but are not limited to, an off center picture, a picture that is smaller than intended, color distortions such as lateral color distortion or color distortions resulting from stress-related birefringence, and the like.

We claim:

1. A method of operating a projection imaging system comprising a microdisplay, projection optics and a viewing screen having an inside surface and an outside surface, said method comprising:

converting an input video signal to image generation commands and transmitting said image generation commands to the microdisplay, said image generation commands corresponding to a reference image pattern;

operating the microdisplay to accept the image generation commands output a visual image to the projection optics, including a visual image of the reference image pattern;

transmitting the visual image through the projection optics, including the visual image of the reference image pattern, to an image plane to create a projected image corresponding to the reference image pattern;

capturing an image of the projected image from the inside surface of the viewing screen and;

comparing the reference image pattern with the captured image, and generating a warping map based on that comparison, and thereafter pre-warping image generation commands according to the warping map so that the projected image is corrected for distortions in the system.

2. The method of claim 1, further comprising the steps of:

projecting the reference image pattern which as been pre-warped based on a primary image warping map;

generating a secondary warping map based on a comparison of the reference image pattern and the captured projected image of the reference image pattern which as been pre-warped based on the primary image warping map;

pre-warping subsequent input video signals using the primary warping map and the secondary warping map, thereby transmitting a pre-warped video signal to the microdisplay which accounts for the warping observed in the reference image pattern which as been pre-warped based on the primary image warping map, to project an undistorted projected image corresponding the input video signals.

3. The method of claim 1, further comprising the steps of capturing the image of the projected image with a camera located within a housing containing the microdisplay and projection optics.

* * * * *